(12) United States Patent
Bensberg et al.

(10) Patent No.: US 12,406,003 B2
(45) Date of Patent: Sep. 2, 2025

(54) GRAPH PROCESSING USING A DOCUMENT STORE

(71) Applicant: SAP SE, Walldorf (DE)

(72) Inventors: Christian Bensberg, Heidelberg (DE); Stefano Belloni, Mannheim (DE); Matthias Hauck, Frankfurt (DE); Mathias Kemeter, Germersheim (DE); Umang Rawat, Heidelberg (DE); Roland Sedler, Ladenberg (DE); Alan Braenzel, Heidelberg (DE); Markus Fath, Wiesloch (DE); Gerald Franz, Wiesloch (DE); Daniel Ritter, Heidelberg (DE); Frank Tetzel, Heidelberg (DE); Marc Jacob, Hockenheim (DE); Hannes Jakschitsch, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/531,298

(22) Filed: Dec. 6, 2023

(65) Prior Publication Data

US 2025/0190492 A1    Jun. 12, 2025

(51) Int. Cl.
*G06F 15/16* (2006.01)
*G06F 16/901* (2019.01)
*G06F 16/93* (2019.01)

(52) U.S. Cl.
CPC .......... *G06F 16/9024* (2019.01); *G06F 16/93* (2019.01)

(58) Field of Classification Search
None
See application file for complete search history.

(56) References Cited

U.S. PATENT DOCUMENTS

2018/0329958 A1*  11/2018  Choudhury ......... G06F 16/2456
2021/0224139 A1*  7/2021   Wang .................... G06F 9/5044

* cited by examiner

*Primary Examiner* — Alex Gofman
(74) *Attorney, Agent, or Firm* — Sterne, Kessler, Goldstein & Fox P.L.L.C.

(57) ABSTRACT

The present invention relates to an improved database system architecture designed for generating and managing heterogeneous graphs. The system utilizes a document store in conjunction with a persistent adjacency index to enhance flexibility, adaptability, and transactional visibility during the generation and modification of complex graph structures. Data stored in the document store utilizes a flexible schema for storing data which improves the efficiency in both storing and retrieving data from the document store during graph-related processing tasks.

17 Claims, 5 Drawing Sheets

GRAPH PROCESSING USING A DOCUMENT STORE

BACKGROUND

Heterogeneous graphs typically involve nodes and edges of different types. In this context, if integrated in, for example, a relational database, tables may be used to represent different types of nodes or edges in the graph, and the relationship between the nodes and edges may be defined by the structure of the tables. In such an implementation, tables may be stored in a column or row store, which is a type of database management system that stores data tables by column or row respectively. The column or row store may store the tables in a collection of tables with each table representing a different entity or type of information of the overall heterogeneous graph. The column or row store may communicate with an adjacency list which is a data structure to represent relationships between the nodes of the heterogeneous graphs. Adjacency lists are typically implemented as a non-persisted cache.

In summary, the system seems to involve a database with tables stored in a column store, where the relationships between entities are represented by a heterogeneous graph. An adjacency list serves as a temporary cache for graph-related data, and there are specific procedures and workspaces for interacting with and manipulating this graph data. The goal is likely to efficiently generate and analyze complex, heterogeneous graphs using a combination of database tables and graph-related tools and structures.

This type of system implementation presents challenges in terms of transactional visibility and dynamic adaptability. Traditional systems, such as those employing column stores and non-persistent caches, face limitations in accommodating evolving graph structures, particularly related to schema constraints and non-persistent caching, potentially impacting the real-time observation of changes to the graph.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
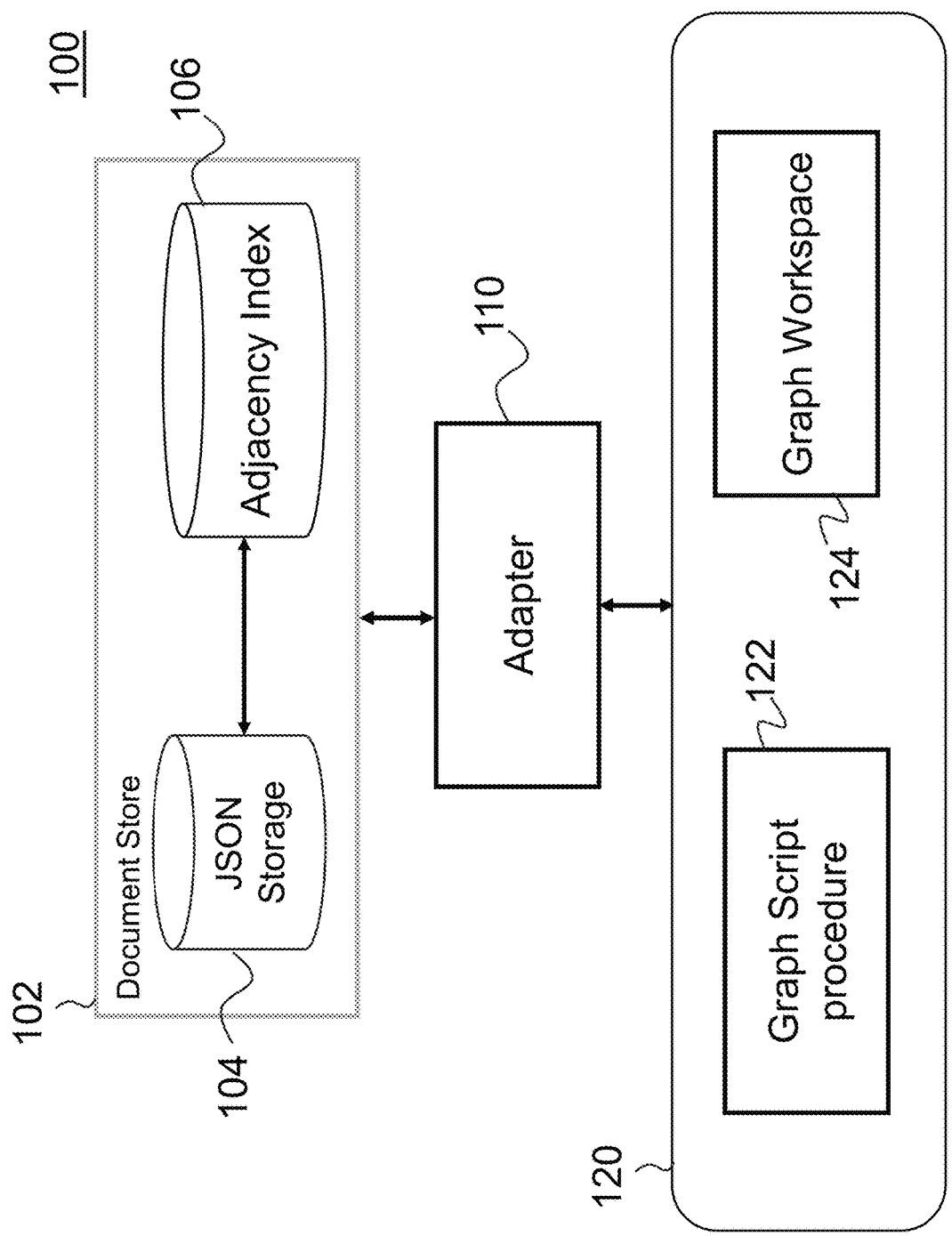
FIG. 1 is a block diagram illustrating an exemplary system for processing graph-related data for heterogeneous graphs, according to some embodiments.

Provided herein are system, apparatus, device, method and/or computer program product embodiments, and/or combinations and sub-combinations thereof, for providing an improved database system architecture for more efficiently generating heterogeneous graphs while also having the advantage of providing the ability to observe and comprehend the changes made to the graph during a transaction. This ability is called transactional visibility and is not possible in conventional systems in which the graph processing is decoupled from the storage. Transactional visibility includes the capacity to track and understand modifications, additions, or deletions of nodes and edges within the heterogeneous graph and ensures that users or processes can observe the state of the graph at different points in time, enhancing the understanding of graph evolution and supporting data consistency.

The proposed database architecture addresses the aforementioned challenges through the integration of a document store and a persistent adjacency index, providing an improved system for generating and managing heterogeneous graphs. An advantage of a document store using JSON format is a more flexible schema-less data storage, which can be beneficial in a scenario where interactions may not conform to a strict schema. Storing data in JSON format enables the document store to provide a adaptable approach to handling various types of graph-related information. Interactions within the document store become less constrained by a predefined schema, making it easier to adapt to evolving data requirements.

Where conventional systems utilize multiple tables within a column or row store to generate and process heterogeneous tables, the improved database system architecture of the present disclosure utilizes schema flexibility to capture the different properties and attributes of nodes and edges of a heterogeneous table.

The adjacency index of the present disclosure is implemented as persistent storage and implemented within the document store which reduces potential delays which are introduced by implementing an adjacency list as a non-persistent cache and as a separate component remote from the data store. As persistent storage, the adjacency index ensures that the adjacency information is always available and does not require a long built-up phase upon first access after some time threshold. Additionally, the persistent adjacency index enhances performance by eliminating the need to repeatedly compute and store adjacency information, leading to more efficient graph operations. Another advantage of conventional adjacency lists is that an adjacency list instance can only represent on snapshot in time since visibility information is not persisted in the adjacency list. This deficiency can be especially problematic for complex graphs and queries. For example, if there is a long running query, data is updated, and afterwards a second query is started, the original adjacency list (when the complex running query was running) needs to be cloned and the updates need to be applied on to the clone (or a new adjacency list needs to be built) in order to start the second query because the long running query still requires the original adjacency list. This is contrast to a persistent adjacency index which stores transactional visibility information; data in the adjacency index may be directly updated and multiple versions maintained per updated data element to allow for multiple queries to use the same adjacency index.

FIG. 1 is a block diagram 100 of an exemplary database system 100 for generating heterogeneous graphs using a document store 102, according to some embodiments. Document store 102 may include JSON storage 104 and an adjacency index 106. JSON storage 104 may be implemented as a schema-less storage component for efficiently managing graph-related data in a JSON format. Graph-related data may be stored in JSON documents. In some embodiments, each JSON document may be implemented to represent a distinct node or edge in a respective heterogeneous graph. In some embodiments, each JSON document may also include attributes which may be utilized to capture properties associated with the nodes and edges. Examples of properties of nodes include node labels, node identifiers, node name, and node creation/modification timestamps; examples of properties of edges include edge identifiers, edge labels, edge weight, directionality, and creation/modification timestamps.

Within document store, JSON data is stored in slices in JSON storage 104. Slices are an internal mechanism to organize large quantities of data. Adjacency index 106 may be co-located with JSON storage 104 (instead of being implemented remotely) and may be generated using JSON data stored in JSON storage 104. In some embodiments, the adjacency index 104 holds the information regarding which vertices of a heterogeneous graph points to other vertices of the graph.

JSON storage 104 and adjacency index 106 have different roles during graph processing. For example, adjacency index 106 may be utilized by scripts to traverse from vertex to vertex of a graph. For some other tasks (e.g. filtering edges with certain fields in the JSON document), the actual JSON data in the JSON storage 104 is needed.

Utilizing JSON for storing graph-related data in JSON storage 104 provides a number of benefits over conventional architecture based on column or row stores. JSON storage 104 stores and provides access to graph-related data using a more flexible schema, meaning that different nodes or edges may have different sets of properties. Information in JSON storage 104 may also include additional metadata such as timestamps, which provide information about when nodes or edges were created or last modified.

The combination of JSON storage 104 which utilizes a flexible schema for defining attributes and properties of nodes and edges along with adjacency index 106 which is implemented as persistent storage contributes to more efficient graph generation. Database system 100 can handle a larger volume of data and process complex graph structures compared to conventional database systems. Another advantage of slice database 104 is that, in some embodiments, JSON documents may be used to represent nested structures, which allows for more complex and hierarchical information to be stored. For example, a node might have nested attributes, which may not have been easily achieved in a flat adjacency list.

Another advantage of JSON storage 104 is that, in some embodiments, JSON documents allow for the inclusion of human-readable labels and names. This usability as user-readable properties of nodes and edges are provided. And another advantage of JSON storage 104 is that JSON documents are modifiable and expandable, enabling the addition or removal of properties without requiring a change to the overall data structure.

The schema flexibility provided by JSON storage 102 is in contrast to table based solutions for storing graph data, which typically have a predefined and fixed structure for storing relationships. Adjacency index 106 may be implemented as a dynamically maintained map of relationships between nodes and edges within a respective heterogeneous graph. In some embodiments, adjacency index 106 may be configured to persistently store and update data associated with these relationships; this is in contrast to a non-persistent adjacency list which would require rebuilding in response to new data or modification of existing data. Rebuilding the adjacency list can be a memory access intensive task, especially as the size and complexity of a heterogeneous graph increases because rebuilding may include reassessing the relationships between nodes, determining which nodes are connected, and updating the adjacency information accordingly.

Conventional systems therefore could experience delays in processing during this rebuilding process. Adjacency index 106 stores data persistently which reduces the delays caused by having to rebuild graph-related data, like with a non-persistent adjacency list. Adjacency information in adjacency index 106 is always available and does not need to be rebuilt for each transactional snapshot. It ensures efficient traversal and retrieval of adjacency information, adhering to the transactional visibility during graph operations.

Database system 100 also includes an adapter 110 for communicating and translating data between graph engine 120 and document store 102. Graph engine 120 may implemented with graph script procedure 110 and a graph workspace 124. In some embodiments, adapter 110 may be configured to translate a graph script procedure 110 into different tasks for graph processing such as graph traversal, attribute lookup, and graph creation. Adapter 110 may be configured to facilitate this translation into tasks in order to communicate with document store 102. In some embodiments, adapter 110 may provide a graph specific application programming interface (API) for graph engine 120 and translates API calls received from graph engine 120 to either generic document store operations (to communicate with JSON storage 104) or specialized adjacency index calls (to communicate with adjacency index 106). In some embodiments, adapter 110 may further be configured to perform session handling and execute certain tasks for enabling communications between document store 102 and graph engine 120. An example of a task performed by adapter 110 is performing ad-hoc translations of vertex/edge keys to the document store keys (e.g., arbitrary signed 64 bit integer) to identifiers usable by the graph engine (e.g., dense 64 bit id ranges).

Graph engine 120 may include graph script procedure 122 and graph workspace 124. In some embodiments, graph engine 120 may also act as an execution environment for graph script procedure 122.

In some embodiments, graph script procedure 122 may be a generated script or set of instructions for performing tasks for manipulating or analyzing graph data stored in document store 102. Examples of these tasks include but are not limited to querying the JSON data in JSON storage 104, traversing a heterogeneous graph, or performing other specific graph-related operations associated with a heterogeneous graph.

Graph workspace 124 may provide metadata about graphs and how they may be used. In some embodiments, graph workspace 124 may provide information about the interfaces and other necessary data (e.g., field names with special meaning) for graph script procedure 122 to interact with document store 102 to query and process graph-related data in JSON documents. The processed data may then be utilized to perform requested graph-related tasks, which may include updating adjacency index 106.

In some embodiments, an output of executing a graph script procedure 122 based on graph workspace 124 is a heterogeneous graph structure. Through the implementation of adjacency index 106, which provides transactional visibility to actions in document store 102, the heterogeneous graph structure may be dynamically updated as new data is stored in document store 102 or as stored data is updated.

In an embodiment, graph engine 120 may initiate a graph script procedure 122 using graph workspace 124. Initiating a graph script procedure 122 may include one or more of setting up an execution environment based on graph workspace 124, triggering the script based on a specific event (e.g., a request, an update to data in document store 102, or a scheduled task), and executing instructions that interact with adapter 110, JSON storage 104, and adjacency index 106 to perform graph-related operations.

During execution, graph script procedure 122 may be configured to initiate API calls to communicate with adapter 110. Adapter 110 translates the API calls into specific instructions to be executed by JSON storage 104 and/or adjacency index 106. Examples of translated API calls include commands or queries that can be processed by JSON storage 104 and/or adjacency index 106. Adapter 110 analyzes requested operations specified by the API call provided by the graph script and translates them into a series of tasks or operations for execution by document store 102. Examples of these tasks include queries, updates, and modifications necessary for generating or modifying the heterogeneous graph.

Depending on the target of the command or query, JSON storage 104 and/or adjacency index 106 may execute graph-related operations indicated by the requested command or query. This execution may involve interacting with a graph collection, processing JSON documents, and updating the persistent adjacency index. A graph collection is a collection of documents stored in JSON storage 104 implemented with adjacency index 106. In some embodiments, graph collections organize graph-related data in JSON format with each collection representing a logical grouping of JSON documents. Collections streamline the organization and retrieval of data because of the logical grouping of documents. Moreover, graph-related operations may be configured to target specific collections which allows for a focused and optimized traversal of data within JSON storage 104. In some embodiments, collections could be designed to correspond to specific types of nodes or edges in the heterogeneous graph. In some embodiments, collections may be defined based on document attributes (e.g., identifier, type, source, target) and documents that contain one or more of the document attributes may be considered to be part of a graph.

In some embodiments, a previously existing collection with JSON data may be turned into a graph collection. If the data is already structured in a way that there are individual documents for edges and vertices respectively, identifiers may be added to the documents, which creates an adjacency index, such as adjacency index 106. Creation of an adjacency index will result in a check as to whether all documents adhere to the schema (i.e., is, they have all the necessary identifiers with their respective types).

In some embodiments, document store 102 may include a second adjacency index (not shown) with switched source and target attributes to allow for bi-directional traversal of a heterogeneous graph. In other words, not only can graph script procedure traverse node/edge relationships from source to target, but could also traversed those relationships in the reverse direction. Moreover, dual adjacency indexes, a first index for source-target relationships and a second for target-source relationships, enable document system 100 to provide more optimized query performance because of the capability for bi-directional data retrieval. Additionally, dual adjacency indexes could provide consistent transactional visibility for either direction of traversal because both indexes contribute to consistent transactional visibility for relationships, regardless of the direction. Graph script procedure 102 can observe changes in relationships from either the source or target perspective.

In some embodiments, this execution includes processing JSON documents in JSON storage 104 to extract or update node and edge attributes based on the requested command or query. In some embodiments, commands or queries may result in retrieving corresponding JSON documents that store graph-related data for the nodes and edges of a particular graph.

Adapter 110 may return responses to the translated API calls from JSON storage 104 and/or adjacency index 106 to graph script procedure 122, which may then use data in the responses to perform the requested graph-related operations. Examples of these operations include querying and modifying graph-related data associated with nodes and edges of a heterogeneous graph. Operations performed by graph script procedure 122 may result in simultaneous updates to data in the adjacency index to reflect changes in relationships between the nodes (vertices) of a graph, in order to maintain a real-time representation of the graph's structure.

Figure 2:
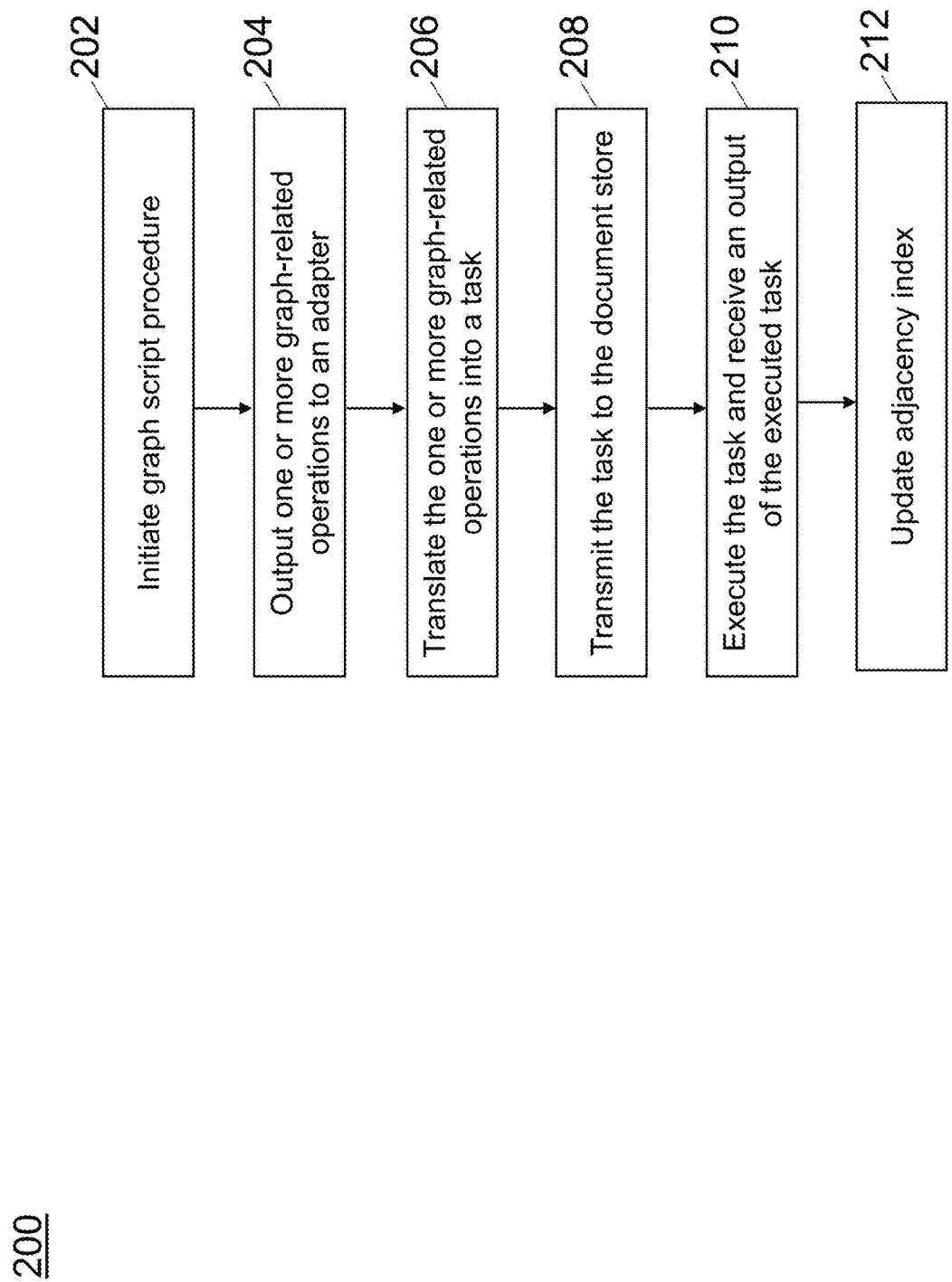
FIG. 2 is a flowchart illustrating example operations for processing graph-related data for heterogeneous graphs, according to some embodiments.

FIG. 2 is a flowchart 200 illustrating example operations for processing graph-related data of a heterogeneous graph using a document store and adjacency index, according to some embodiments. Method 200 can be performed by processing logic that can comprise hardware (e.g., circuitry, dedicated logic, programmable logic, microcode, etc.), software (e.g., instructions executing on a processing device), or a combination thereof. As a non-limiting example of FIG. 1, one or more functions described with respect to FIG. 2 may be performed by a one or more components of a database system (e.g., database system 100 of FIG. 1). In such an embodiment, any of these components may execute code in memory to perform certain steps of method 200. While method 200 will be discussed below as being performed by certain components of database system 100, other components may store the code and therefore may execute method 200 by directly executing the code. Accordingly, the following discussion of method 200 will refer to components of FIG. 1 as an exemplary non-limiting embodiment. Moreover, it is to be appreciated that not all steps may be needed to perform the disclosure provided herein. Further, some of the functions may be performed simultaneously, in a different order, or by the same components than shown in FIG. 2, as will be understood by a person of ordinary skill in the art.

In 202, graph engine 120 initiates a graph script procedure 122 for processing graph-related data of a heterogeneous graph. Initiating a graph script procedure involves beginning the execution of a set of predefined instructions or code that defines operations to be performed on a heterogeneous graph. In some embodiments, before initiation, a graph script procedure is defined, typically as a series of instructions or code written in a programming or scripting language, and stored in graph engine 120. These instructions may provide details regarding the specific operations to be performed on the graph data.

In some embodiments, the initiating of the graph script procedure occurs within a graph workspace 124 which may include establishing an execution environment using a graph workspace 124. Establishing such an environment may include allocating graph engine resources for initiating the graph script procedure and confirming that adapter 110 and document store 102 are ready for processing.

In some embodiments, initiating of graph script procedure 122 may be based on a trigger event, such as a user request, a scheduled task, or any updates to data stored in document store 102.

A result of initiating the graph script procedure 122 includes a graph-related operation. In some embodiments, the result may include one or more graph-related operations on the basis of initiating the graph script procedure 122. Examples of graph-related operation includes any operations performed on data stored in document store 102 including node and edge attributes.

In 204, graph engine 120 provides the graph-related operation to adapter 110. Provision of the graph-related operation, which is a high-level command, may include utilizing one or more API calls provided by adapter 110.

In 206, adapter 110 translate the graph-related operation into a task to be performed by document store 102. In some embodiments, adapter 110 may translate the graph-related operation into one or more tasks depending on the graph-related operation (e.g., if there are more than one graph-related operations). A task may include specific instructions that are formatted for execution by document store 102. This translation ensures that the requested graph-related operation can be executed by document store 102.

In 208, adapter 110 transmits the task to document store 102 for execution by JSON storage 104 and/or adjacency index 106. Examples of tasks include querying, updating, or modifying nodes and edges within the graph data stored in slice database 104.

In 210, document store 102 executes the task and receives an output of task. In some embodiments, document store 102 executes the graph-related operations specified by the translated tasks. For example, in some embodiments, tasks result in queries to graph collections and processing of documents (e.g., JSON) stored in JSON storage 104. As another example, processing JSON documents within the collections may include extracting or modifying node and edge properties.

In 212, document store 102 automatically updates adjacency index 106 based on the output of the task to reflect changes in relationships between nodes and maintaining a real-time representation of the structure of the graph.

Figure 3A:
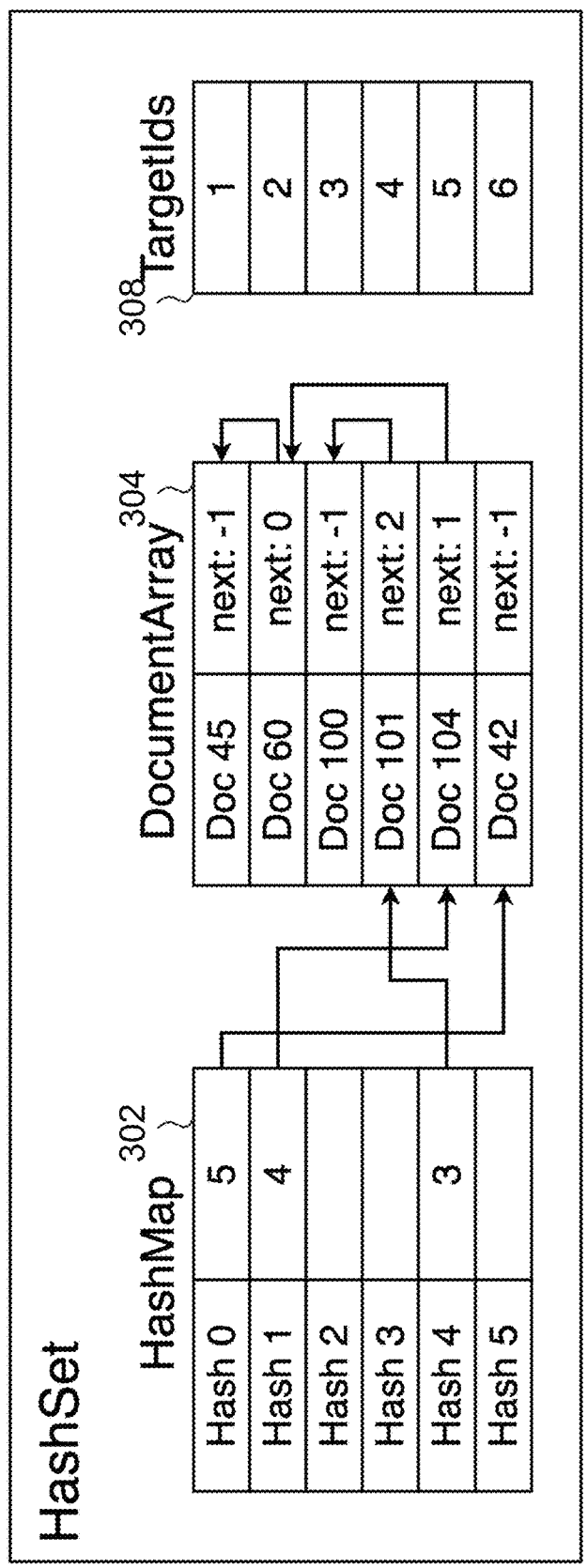
FIGS. 3A and 3B are exemplary implementations of an adjacency index, according to some embodiments.

FIG. 3A is an exemplary implementation of adjacency index 106 as a hash set 300A. Hash set 300A may include a hash map 302, a document array 304, and a target identifier table 308.

Hash map 302 is configured to store key-value pairs, where the keys represent nodes of a heterogeneous graph, and the values are references to associated documents or rows of document array 304. Document array 304 includes information associated with each key (node ID) in the hash map is a document array. In some embodiments, document array 304 may store information about the relationships of the corresponding target node and may include or communicate with a target identifier table 308. In some embodiments, the target node may be uniquely identified with an identifier. For a given hash value, multiple documents may be stored for that hash value. In order to retrieve and check all of the documents, entries in the document array 304 may have a pointer to further entries within the same data structure.

In some embodiments, hash map 302 in the hash set data structure efficiently maps node identifiers (e.g., source nodes) to corresponding entries in the data structure.

In some embodiments, hash map 302 may be populated with nodes as keys, and the documents corresponding to the nodes are initialized in document array 304. As relationships are added or modified in the graph, hash map 302 may be updated, and document array 304 may be extended or modified accordingly. Hash map 302 provides efficient lookup for nodes; for example, once a node is located in the hash map (e.g., in response to a task from graph script procedure 122), document array 304 may facilitate quick retrieval of relationship information.

Target identifier table 308 may be configured for storing target identifiers and can be used for managing target nodes associated with edges in a heterogeneous graph. Table identifier table 308 within the document array facilitates quick retrieval of target node information for each edge.

Figure 3B:
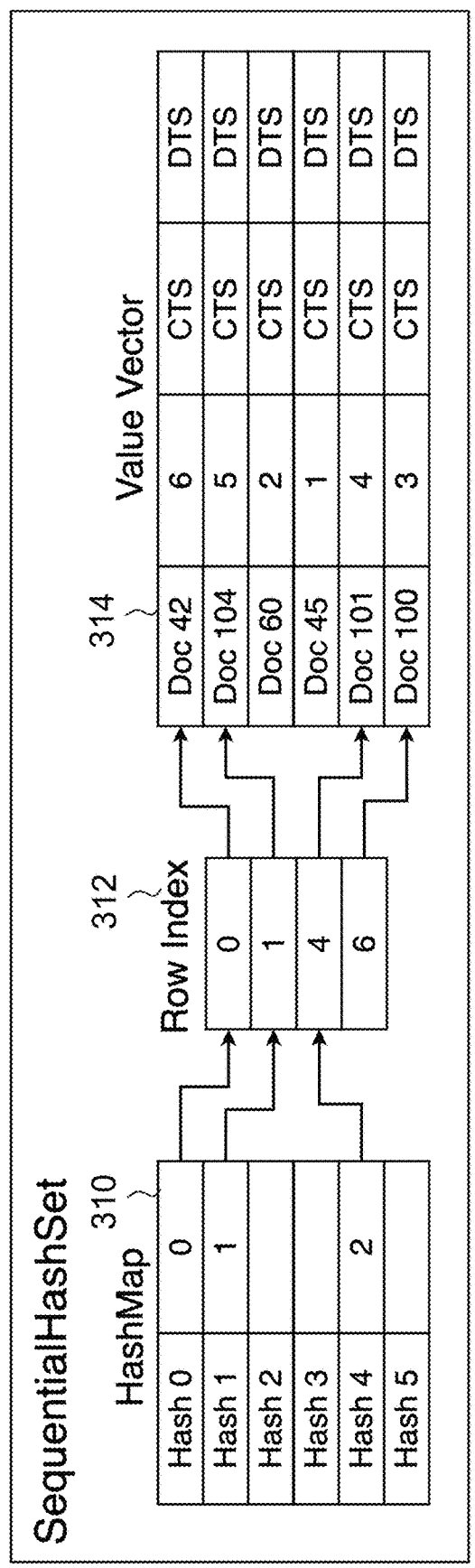

FIG. 3B is an exemplary implementation of adjacency index 106 as a sequential hash set 300B. Sequential hash set 300B may include a hash map 310, a row index 312, and a value vector table 314.

Hash map 310 operates similarly to hash map 302 mapping node identifiers to their corresponding entries in the data structure. Row index 312 maintains a sequential ordering of the nodes, allowing for efficient sequential traversal and lookup of nodes. For example, in FIG. 3B, row index 312 includes "0" and "1" values, where "0" may indicate the starting entry and "1" may be the delimiter. In such an embodiment, entry "0" points to "Doc 42" in value vector table 314. As another example, the third value in row index 312 is "4." This means that for the starting entry "1," the delimiter of "4" is to be used. Accordingly, entry "1" points to three consecutive entries in value vector table 314, e.g., documents Doc 104, Doc 60 and Doc 45.

In some embodiments, each entry in value vector table 314 may have a create timestamp (CTS) and delete timestamp (DTS), which may be used to control the transactional visibility of a corresponding entry. When a transaction commits, a CTS is created for that transaction. A new CTS is always 1 higher than the previous CTS, which results in a linear and consecutive order of commits. Each running transaction may also be implemented with a read timestamp that can specify which commits may be read. When an entry in JSON storage 104 is created (e.g., via an INSERT or UPDATE), a corresponding entry is created in the adjacency index 106. The corresponding CTS associated with the change may then be stored as a CTS. When an entry is deleted (e.g., via an UPDATE or DELETE in JSON storage 104), a DTS may be written in the adjacency index 106. Implemented in this manner—per transaction using the Adjacency Index 106—it may be determined whether an entry is visible for the current transaction or not.

Each entry in the hash map is associated with a value vector in value vector table 314, which contains information about the relationships of the corresponding node, similar to document array 304 in hash set 300A. In some embodiments, each element in the value vector table 314 may represent an edge, storing details such as the target node ID and additional properties.

In some embodiments, hash map 310 is populated with nodes, and row index 312 is built to maintain the sequential order of nodes. The value vectors associated with each node in value vector table 314 may be initialized. As graph relationships are added or modified, values in hash map 310, row index 312, and value vector table 314 may be updated accordingly.

The presence of row index 312 allows for efficient sequential traversal of nodes, such as when tasks require processing or analyzing the graph in a sequential order, such as during graph algorithms or graph analytics.

Whether to implement adjacency index 106 using hash set 300A or sequential hash set 300B may depend on specific uses of database system 100 such as the desired queries and requirements of database system 100. Hash set 300A is suited for data that changes frequently because additions to the data in hash set 300A may be made easily. In some embodiments, document array 304 may be maintained as a linked list that allows additions at arbitrary spots. Sequential hash set 300B is suited for data that does not change because value vector table 314 may not be suited for additions or modifications. Sequential hash set 300B is suited for sparsely populated graphs as it yields a very high compression rate due to its representation of data. In many scenarios, older data does not change frequently, especially compared to new data. Therefore, in some embodiments of adjacency index 106, new data may be added into hash set 300A, whereas older data is converted periodically into sequential hash set 300B. In this fashion, hash set 300A may serve as an inbound queue for sequential hash set 300B.

In some embodiments, sequential hash set 300B may be implemented as multiple different hash sets. New data may be written into a new sequential hash set of sequential hash set 300B, without the need to re-write data of other sequential hash sets. When one or more entries in a hash set are deleted, a DTS is set. This can be set in-place within a sequential hash set 300B without the need to re-write it. In some embodiments, periodic re-writing of such sequential hash sets may be beneficial to remove old entries, which could speed-up processing and reduce the overall memory consumption.

Exemplary Computer System

Figure 4:
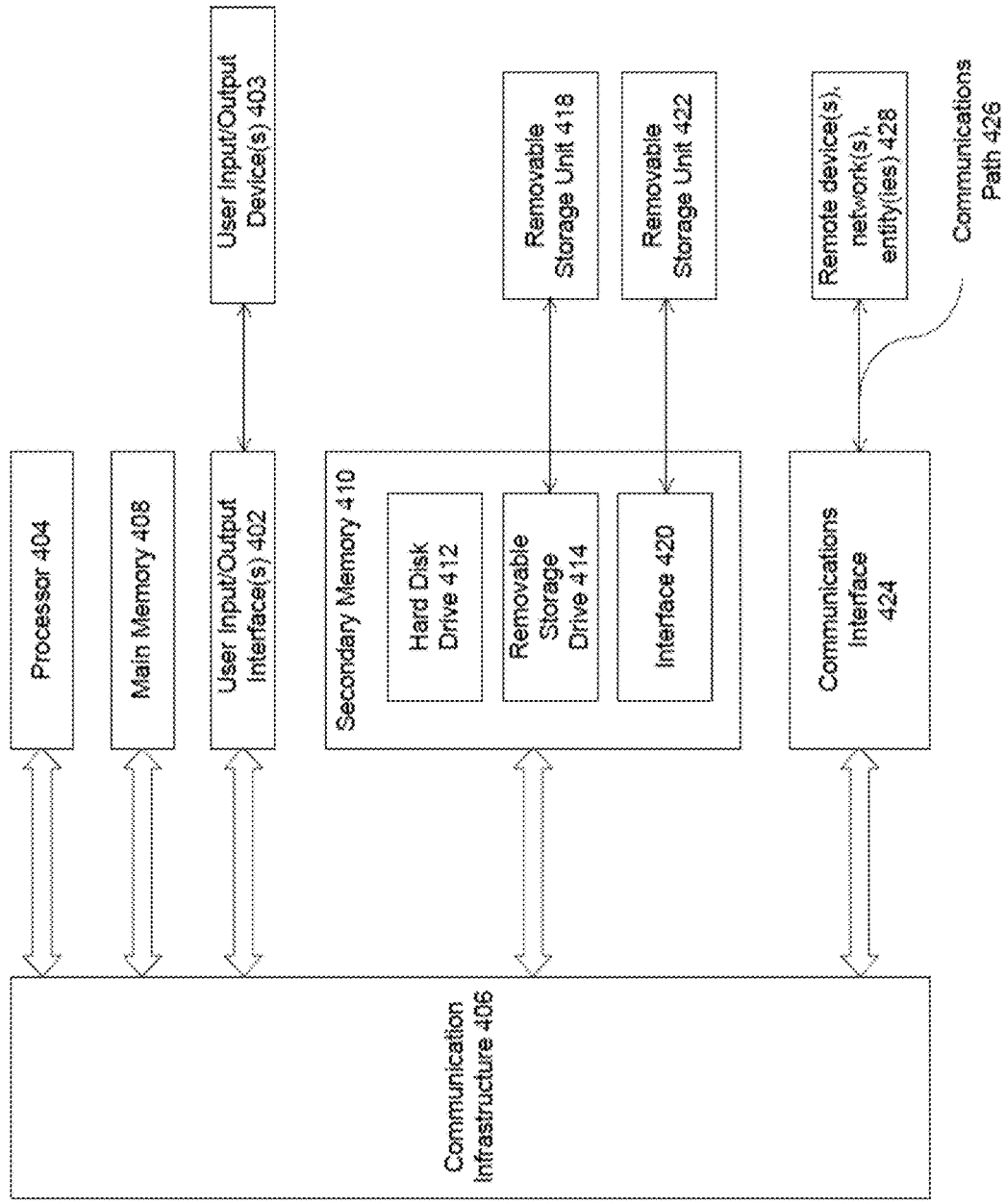
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A database system for generating a heterogeneous graph, the database system comprising:
   a memory configured to store a document store, wherein the document store comprises a JSON storage and an adjacency index, wherein the JSON storage is configured to store graph-related data in one or more documents, wherein each document of the one or more documents represents a node within the heterogeneous graph, wherein the adjacency index is implemented as a persistent cache, and wherein the adjacency index is configured to store mapping information between nodes within the heterogeneous graph, wherein the adjacency index comprises a hash set with a hash map and a row index, and wherein the hash map is configured to store the mapping information between nodes within the heterogeneous graph, the row index is configured to store a sequential ordering of the nodes within the heterogeneous graph; and
   a processor in communication with the memory and configured to cause a graph engine configured to:
   store a graph script procedure for generating a heterogeneous table, wherein the graph script procedure identifies the one or more documents in the JSON storage; and
   initiate the graph script procedure in a graph workspace, wherein the initiating provides one or more graph-related operations for processing the graph-related data;
   wherein the processor is further configured to cause an adapter to:
   receive the one or more graph-related operations from the graph engine;
   translate the one or more graph-related operations into a task to be performed by the document store; and
   transmit the task to the document store;
   wherein the document store is further configured to:
   perform execution of the task to process the graph-related data based on the graph-related data of the one or more documents; and
   return an output of the execution of the task to the adapter.

2. The database system of claim 1, wherein the execution of the task comprises:
   querying the one or more documents in the JSON storage;
   receiving the graph-related data of the one or more documents;
   identifying at least one of a node attribute or an edge relationship from the graph-related data; and
   updating a node or an edge of the heterogeneous graph based on the at least one of the node attribute or the edge relationship.

3. The database system of claim 1, wherein the graph-related data in the one or more documents is in a JSON format and the one or more documents are implemented as JSON documents.

4. The database system of claim 1, wherein the one or more documents include attributes associated with one or more properties of nodes and edges of the heterogeneous graph.

5. The database system of claim 1, wherein the document store is further configured to update the mapping information in the adjacency index responsive to a modification of any node of the nodes of the heterogeneous graph without requiring recomputation of the mapping information.

6. The database system of claim 5, wherein the one or more graph-related operations further include the modification of any node of the nodes of the heterogeneous graph.

7. A method for generating a heterogeneous graph, the method comprising:
- storing, in a document store comprising JSON storage and an adjacency index, graph-related data in one or more documents, wherein each document of the one or more documents represents a node within the heterogeneous graph, wherein the adjacency index is implemented as a persistent cache, and wherein the one or more documents are stored in the JSON storage, wherein the adjacency index comprises a hash set with a hash map and a row index, and wherein the hash map is configured to store mapping information between nodes within the heterogeneous graph, the row index is configured to store a sequential ordering of the nodes within the heterogeneous graph;
- storing, in the adjacency index, the mapping information between nodes within the heterogeneous graph;
- storing, by a graph engine, a graph script procedure for generating a heterogeneous table, wherein the graph script procedure identifies the one or more documents in the JSON storage;
- initiating, by the graph engine, the graph script procedure in a graph workspace, wherein the initiating provides one or more graph-related operations for processing the graph-related data;
- receiving, by an adapter communicatively coupled to the document store and the graph engine, the one or more graph-related operations from the graph engine;
- translating, by the adapter, the one or more graph-related operations into a task to be performed by the document store;
- transmitting, by the adapter, the task to the document store;
- performing, by the document store, execution of the task to process the graph-related data based on the graph-related data of the one or more documents; and
- returning an output of the execution of the task to the adapter.

8. The method of claim 7, wherein the execution of the task comprises:
- querying the one or more documents in the JSON storage;
- receiving the graph-related data of the one or more documents;
- identifying at least one of a node attribute or an edge relationship from the graph-related data; and
- updating a node or an edge of the heterogeneous graph based on the at least one of the node attribute or the edge relationship.

9. The method of claim 7, wherein the graph-related data in the one or more documents is in a JSON format and the one or more documents are implemented as JSON documents.

10. The method of claim 7, wherein the one or more documents include attributes associated with one or more properties of nodes and edges of the heterogeneous graph.

11. The method of claim 7, wherein the document store is further configured to update the mapping information in the adjacency index responsive to a modification of any node of the nodes of the heterogeneous graph without requiring recomputation of the mapping information.

12. The method of claim 11, wherein the one or more graph-related operations further include the modification of any node of the nodes of the heterogeneous graph.

13. A non-transitory computer-readable device having instructions stored thereon that, when executed by at least one computing device, cause the at least one computing device to generate a heterogeneous graph by performing operations comprising:
- storing, in a document store comprising JSON storage and an adjacency index, graph-related data in one or more documents, wherein each document of the one or more documents represents a node within the heterogeneous graph, wherein the adjacency index is implemented as a persistent cache, and wherein the one or more documents are stored in the JSON storage, wherein the adjacency index comprises a hash set with a hash map and a row index, and wherein the hash map is configured to store mapping information between nodes within the heterogeneous graph, the row index is configured to store a sequential ordering of the nodes within the heterogeneous graph;
- storing, in the adjacency index, the mapping information between nodes within the heterogeneous graph, wherein the mapping information is persistently stored in the adjacency index;
- storing, in a graph engine, a graph script procedure for generating a heterogeneous table, wherein the graph script procedure identifies the one or more documents in the JSON storage;
- initiating the graph script procedure in a graph workspace, wherein the initiating provides one or more graph-related operations for processing the graph-related data;
- receiving the one or more graph-related operations from the graph engine;
- translating the one or more graph-related operations into a task to be performed by the document store;
- transmitting the task to the document store;
- performing execution of the task to process the graph-related data based on the graph-related data of the one or more documents; and
- returning an output of the execution of the task.

14. The non-transitory computer-readable device of claim 13, wherein the execution of the task comprises:
- querying the one or more documents in the JSON storage;
- receiving the graph-related data of the one or more documents;
- identifying at least one of a node attribute or an edge relationship from the graph-related data; and
- updating a node or an edge of the heterogeneous graph based on the at least one of the node attribute or the edge relationship.

15. The non-transitory computer-readable device of claim 13, wherein the graph-related data in the one or more documents is in a JSON format and the one or more documents are implemented as JSON documents.

16. The non-transitory computer-readable device of claim 13, wherein the one or more documents include attributes associated with one or more properties of nodes and edges of the heterogeneous graph.

17. The non-transitory computer-readable device of claim 13, wherein the document store is further configured to update the mapping information in the adjacency index responsive to a modification of any node of the nodes of the heterogeneous graph without requiring recomputation of the mapping information.

* * * * *